United States Patent
Petkar et al.

(10) Patent No.: US 12,326,553 B2
(45) Date of Patent: Jun. 10, 2025

(54) TOOL STABILIZATION MECHANISM AND RELATED METHODS

(71) Applicants: General Electric Company, Schenectady, NY (US); OLIVER CRISPIN ROBOTICS LIMITED, Altrincham (GB)

(72) Inventors: Kirti Arvind Petkar, Bengaluru (IN); Sandeep Kumar, Bengaluru (IN); Jayasankar Madhusoodanan Nair, Bengaluru (IN); Andrew Crispin Graham, Badminton (GB)

(73) Assignees: General Electric Company, Schenectady, NY (US); OLIVER CRISPIN ROBOTICS LIMITED, Altrincham (GB)

( * ) Notice: Subject to any disclaimer, the term of this patent is extended or adjusted under 35 U.S.C. 154(b) by 140 days.

(21) Appl. No.: 17/843,035

(22) Filed: Jun. 17, 2022

(65) Prior Publication Data

US 2023/0305286 A1  Sep. 28, 2023

(30) Foreign Application Priority Data

Mar. 25, 2022 (IN) .............................. 202211017007

(51) Int. Cl.
*G02B 23/24* (2006.01)
*G01N 21/954* (2006.01)
(Continued)

(52) U.S. Cl.
CPC ....... *G02B 23/2484* (2013.01); *G01N 21/954* (2013.01); *H04N 23/50* (2023.01);
(Continued)

(58) Field of Classification Search
CPC ............. G02B 23/2484; G01N 21/954; G01N 2021/9544; G01N 2201/021; H04N 23/50; H04N 23/685; H04N 23/90; H04N 23/555
See application file for complete search history.

(56) References Cited

U.S. PATENT DOCUMENTS 3,555,689 A   1/1971  Cubberly, Jr.
4,751,821 A   6/1988  Birchard
(Continued)

FOREIGN PATENT DOCUMENTS

DE  4202138  8/1993
EP  2170565  4/2010
(Continued)

OTHER PUBLICATIONS

Advanced Inspection Technologies, Inc.; "Mentor Visual IQ HD Video Borescope"; https://marketplace.aviationweek.com/product/mentor-visual-iq-hd-video-borescope; available at least as early as Jun. 2020; 3 pages.

*Primary Examiner* — Nasim N Nirjhar
(74) *Attorney, Agent, or Firm* — Fitch, Even, Tabin & Flannery LLP

(57) ABSTRACT

A tool stabilization mechanism is disclosed including a stabilizing device connected to a tool and movable between a deployed position and a non-deployed position, and an actuator for actuating the stabilizing device to move between the deployed position and the non-deployed position. In some forms the tool stabilization mechanism is integrated into a borescope unit, while in other forms it may be an accessory attachable to conventional borescope units. Related methods to the above are also disclosed herein.

16 Claims, 10 Drawing Sheets

(51) Int. Cl.
*H04N 23/50* (2023.01)
*H04N 23/68* (2023.01)
*H04N 23/90* (2023.01)

(52) U.S. Cl.
CPC ........... *H04N 23/685* (2023.01); *H04N 23/90* (2023.01); *G01N 2021/9544* (2013.01); *G01N 2201/021* (2013.01); *H04N 23/555* (2023.01)

(56) References Cited

U.S. PATENT DOCUMENTS

| | | | |
|---|---|---|---|
| 5,329,824 | A | 7/1994 | Carapezza |
| 5,365,331 | A | 11/1994 | Tamburrino |
| 5,662,587 | A | 9/1997 | Grundfest |
| 6,862,945 | B2 | 3/2005 | Chapman |
| 7,662,091 | B2 | 2/2010 | Bagley |
| 8,245,799 | B2 | 8/2012 | Chiel |
| 8,314,834 | B2 | 11/2012 | Konomura |
| 8,630,817 | B2 | 1/2014 | Fraser |
| 10,488,349 | B2 | 11/2019 | Sibbach |
| 10,871,453 | B2 | 12/2020 | Watanabe |
| 2007/0083084 | A1 | 4/2007 | Esashi |
| 2009/0171152 | A1 | 7/2009 | Aoki |
| 2009/0207302 | A1 | 8/2009 | Neffendorf |
| 2011/0172519 | A1* | 7/2011 | Cao .......... G02B 6/001 600/424 |
| 2013/0038872 | A1 | 2/2013 | Fujiwara |
| 2015/0209024 | A1 | 7/2015 | Piskun |
| 2021/0136328 | A1* | 5/2021 | Barthel ............. A61B 1/00087 |
| 2021/0338214 | A1* | 11/2021 | Pandey ............. A61B 1/00128 |
| 2021/0387746 | A1 | 12/2021 | Danko |
| 2022/0082473 | A1 | 3/2022 | Peters |
| 2022/0084178 | A1 | 3/2022 | Peters |
| 2022/0132040 | A1* | 4/2022 | McCrackin ........... H04N 23/64 |
| 2023/0120378 | A1 | 4/2023 | Thorsten |

FOREIGN PATENT DOCUMENTS

| | | | |
|---|---|---|---|
| GB | 1247119 | | 9/1971 |
| JP | 2018189169 A | * | 11/2018 ............. F15B 15/10 |
| KR | 200410388 | | 3/2006 |

* cited by examiner

Camera Attached At The Back Of The Mechanism

Camera Attached In The Front Of The Mechanism

Multiple Cameras And 1 Cage

Multiple Cameras And Multiple Cages

TOOL STABILIZATION MECHANISM AND RELATED METHODS

CROSS-REFERENCE TO RELATED APPLICATIONS

This application claims priority to Indian Provisional Application No. 202211017007, filed Mar. 25, 2022, and is hereby incorporated herein by reference in its entirety.

TECHNICAL FIELD

These teachings relate generally to jet engines and more particularly to a tool stabilization mechanism for use in inspecting such engines and related methods.

BACKGROUND

Aircraft engines typically include an air intake stage, a compressor stage, a combustor stage, a turbine stage and an exhaust stage. Such turbine engines are often inspected between uses in the field to determine if there are any issues requiring further servicing of the engine. For example, it is routine to inspect such engines for signs of wear or other problems (e.g., corrosion, leaks such as of oil, cracks, fractures, foreign object damage ("FOD"), etc.). This saves time and helps ensure only engines that are in need of more thorough inspection or service are withdrawn from use.

To perform such inspections, it is typical to use a borescope to inspect the engine parts to minimize the amount engine disassembly required to perform the inspection and to inspect hard-to-reach or hard-to-see portions of the engine. For example, the engine combustion chamber or hot section of the engine may be inspected by the removal of a fuel nozzle or ignitor to insert the borescope through the respective port and gain access to the interior of the engine's combustion chamber. Other times, the engine may have dedicated access ports for such inspection purposes, sometimes called borescope ports. Inspection of other parts of the engine may be conducted in similar fashion (e.g., inserting the borescope through inlet screens to inspect the compressor portion, etc.).

After the inspection, the ports used to access the interior of the engine are closed or sealed back up (e.g., covered, the fuel nozzle put back in if such was removed to gain access to the engine interior, etc.) and the service work logged for this activity.

A need exists to help improve the efficiency of such inspections.

BRIEF DESCRIPTION OF THE DRAWINGS

Various needs are at least partially met through provision of the TOOL STABILIZATION MECHANISM AND RELATED METHODS described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
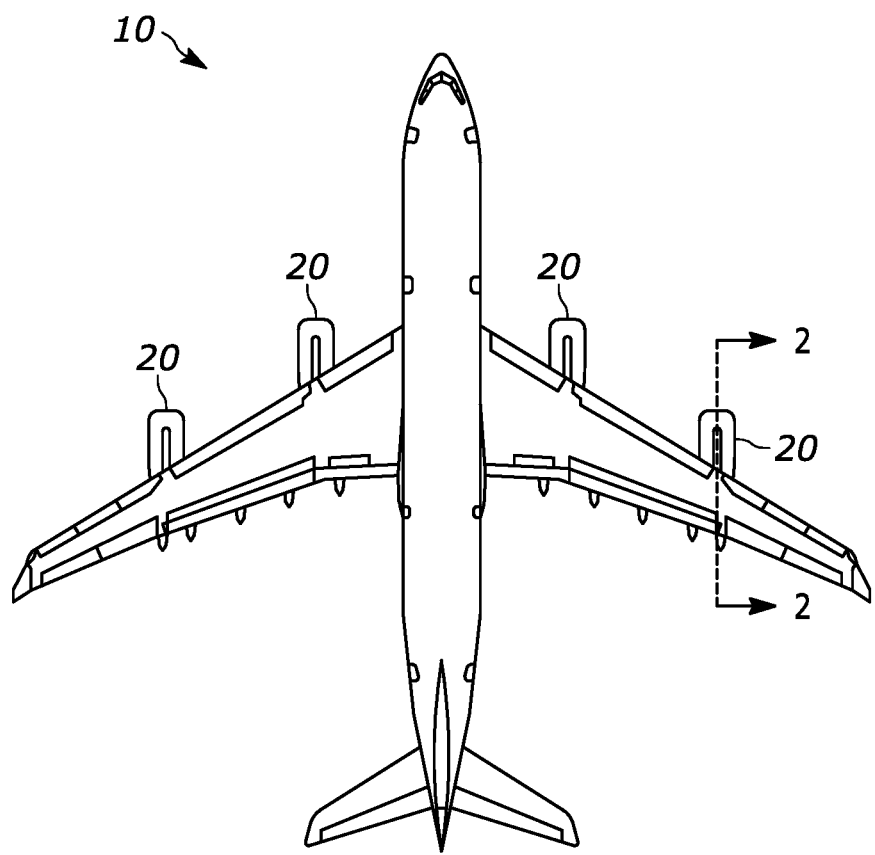
FIG. 1 comprises a top plan view of an exemplary aircraft having at least one engine for inspection with a tool stabilization mechanism as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

As mentioned above, it is common to use tools, such as borescopes, to inspect engines, however, in practice, this requires one to become very skilled at maneuvering the borescope so that all interior portions of the engine can be properly viewed (a talent that takes time to master) and/or it requires the purchase and use of much more expensive borescopes with articulating heads and complicated motor driven systems to perform such inspection. Conventional borescopes are flexible borescopes which prevent deployment in cantilever fashion in relatively open spaces or cavities due to their flexibility (e.g., you cannot span large gaps or cavities because their flexibility prevents control the probe to lift it off nearby surfaces). For example, when inserting the borescope into an internal cavity of a turbine engine, the borescope will typically start to vibrate and/or deflect after traveling only thirty to fifty percent (30%-50%) into the cavity under inspection. These are all significant challenges in the context of aviation application settings.

Generally speaking, the various aspects of the present disclosure can be employed with a tool stabilization mechanism having a stabilizer or stabilizing device (referred to hereinafter as a stabilizing device) that moves between deployed and non-deployed positions and an actuator that moves the stabilizing device between the deployed and non-deployed positions. The stabilizing device may be any item capable of expanding to stabilize the tool. In one form, the tool is a borescope for inspecting jet engines and the stabilizing device may either be an inflatable bladder or one or more protruding members, both of which extend outward from the borescope when in the deployed position to engage at least one surrounding environmental surface (e.g., interior surface of a cavity) to stabilize and help to position the borescope during inspection. Once finished, the user can move the stabilizing device to the non-deployed position to make it easier to insert or withdraw the borescope from the cavity or region to be inspected. In some forms, the tool stabilization mechanism is provided as an accessory for attachment to, and use with, any conventional borescope. While in other forms, the tool stabilization mechanism is integrated into a borescope and provided collectively as one complete borescope unit.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent (10%) margin.

Figure 2:
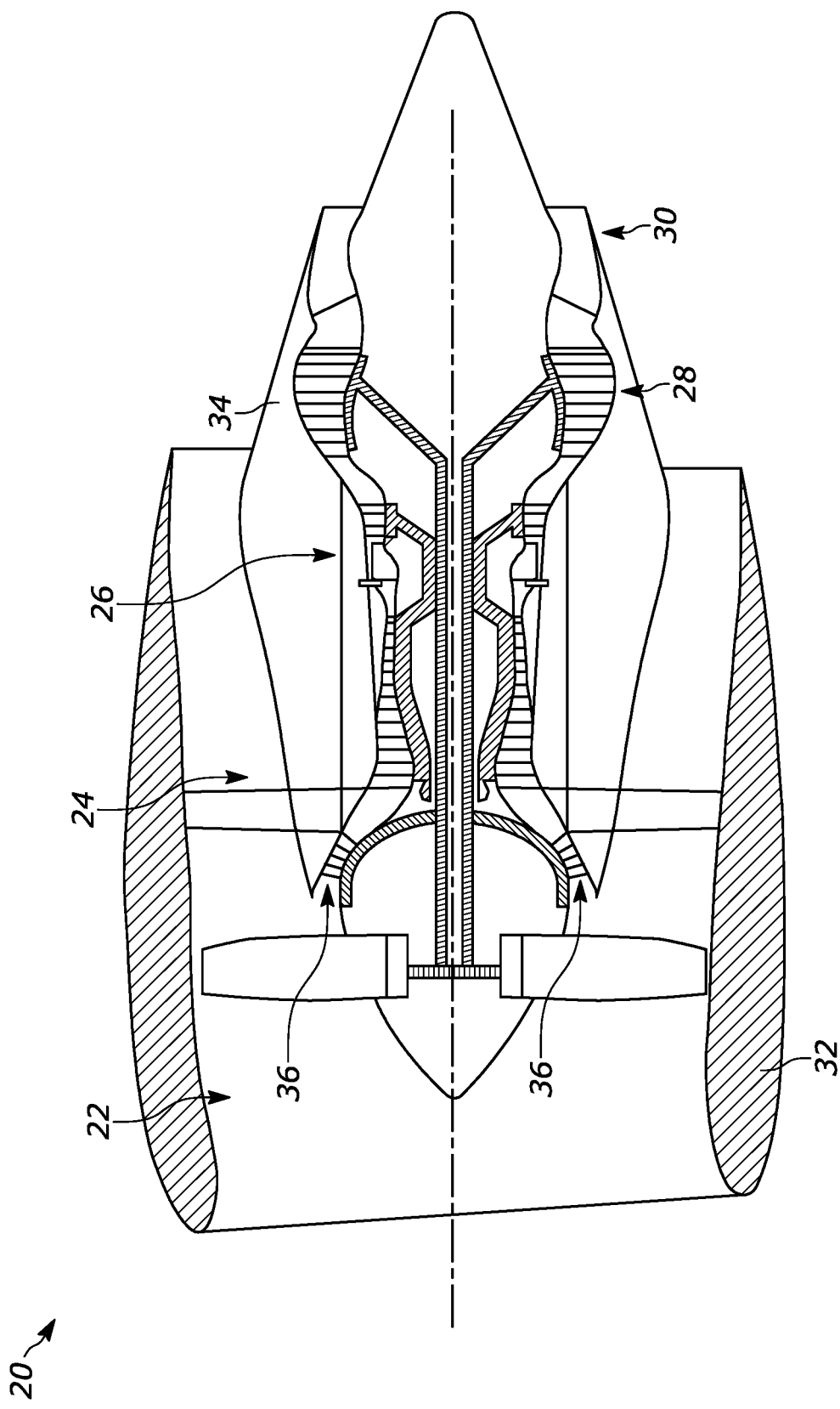
FIG. 2 comprises a schematic view of the gas turbine engine shown in FIG. 1 which is to be inspected with a tool having a tool stabilization mechanism as configured in accordance with various embodiments of these teachings.

The foregoing and other benefits may become clearer upon making a thorough review and study of the following detailed description. Referring now to the drawings, and in particular to FIGS. 1-2, an illustrative example of an airplane 10 is provided having engines 20 that may be inspected with a tool having a tool stabilization mechanism that is compatible with many of the teachings herein which will now be presented. Engine 20 may be any turbine engine and preferably has an air intake stage 22, a compressor stage 24, a combustion stage 26, a turbine stage 28 and an exhaust stage 30. In the form shown, the engine 20 has an outer engine housing or fan casing 32 with an inner core engine 34 disposed therein and containing the core engine intake 36, compressor stage 24, combustion stage 26, turbine stage 28 and exhaust stage 30. In one form, the engine 20 is a gas turbine engine commercially available from General Electric Company, Cincinnati, Ohio.

As mentioned above, engines such as engine 20 are often inspected between uses in the field to determine if there are any issues requiring further servicing of the engine. For example, it is routine to inspect such engines for signs of wear or other problems (e.g., corrosion, leaks such as of oil, cracks, fractures, foreign object damage ("FOD"), etc.). This saves time and helps ensure only engines that are in need of more thorough inspection or service are withdrawn from use in the field. Referring now to FIGS. 1-4B, to perform such inspections, it is typical to use a borescope tool, such as borescope 100, to inspect the engine parts to minimize the amount of engine disassembly required to perform the inspection and to inspect hard-to-reach or hard-to-see portions of the engine 20. For example, the hot section of the engine 20 or engine combustion chamber 26 may be inspected by the removal of a fuel nozzle or ignitor to insert the borescope through the associated port and gain access to the interior of the engine's combustion chamber 26. Other times, the engine may have dedicated access ports for such inspection purposes, sometimes called borescope ports. Typically, two to four of these access ports will be used to allow for inspection about the entire circumference of the engine 20, but fewer or more access ports may be used as desired. When four ports are used, the engine 20 is divided into quadrants for inspection (e.g., each taking up about ninety degrees (90°) of the overall circumference). In many applications, numerous nozzles or port openings will be available to provide access for the borescope 100 at a variety of different spacing, thus, not requiring the boresecope 100 to cover ninety degrees, but rather allowing the borescope 100 to be aligned with desired features for inspection at a spacing other than ninety degrees to each other, for optimal alignment with the features of interest and/or to enable similar tooling to be used through each port.

As will be discussed further below, an advantage of the tool stabilization mechanism 110 disclosed herein is that fewer access ports may be needed for tools that take advantage of the tool stabilization mechanism 110 disclosed herein as there is less impact from borescope 100 deflection and/or vibration throughout the range of travel of the borescope 100.

While the combustion stage 26 of the engine 20 will be the example focused on most heavily in this disclosure, it should be understood that other parts of the engine 20 may be inspected utilizing the tool stabilization mechanism 110. For example, inspections may be conducted in similar fashion for all other vanes, blades, turbines, stages, stage surfaces, etc. For now, however, we will focus on the tool stabilization mechanism 110 and its use in inspecting combustion stage 26.

To inspect the combustion stage 26 of engine 20, one or more of the fuel injectors (or ignitor) will be removed from its respective fuel injector port (or ignitor port) so that the port may be used to provide access to the interior of combustion stage 26. Borescope 100 includes a borescope probe 102 that comprises a flexible tube with a camera 104 therein or thereon. In the form shown, the borescope 100 has a battery-operated handheld unit 106 with a display 108 for displaying the image obtained by camera 104. In some forms, unit 106 will contain further output ports (e.g., VGA ports to allow for the image to be displayed on larger displays such as TVs or monitors, USB ports to download images or movie files taken from the borescope 100, etc.), or even include other drivers, such as Wi-Fi or Bluetooth drivers to wirelessly share data to a remote device. In addition, a user input, such as joystick 109, may be provided if the borescope 100 includes an articulated probe (or probe head) to manipulate the probe 102 in the direction desired by the user while in use.

Figure 3A:
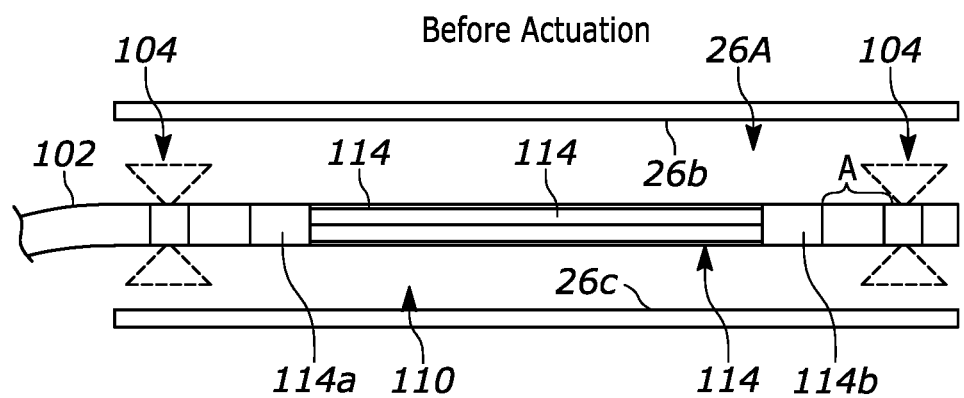
FIG. 3A comprises a schematic view of a tool having a tool stabilization mechanism before actuation as configured in accordance with various embodiments of these teachings.
Figure 3B:
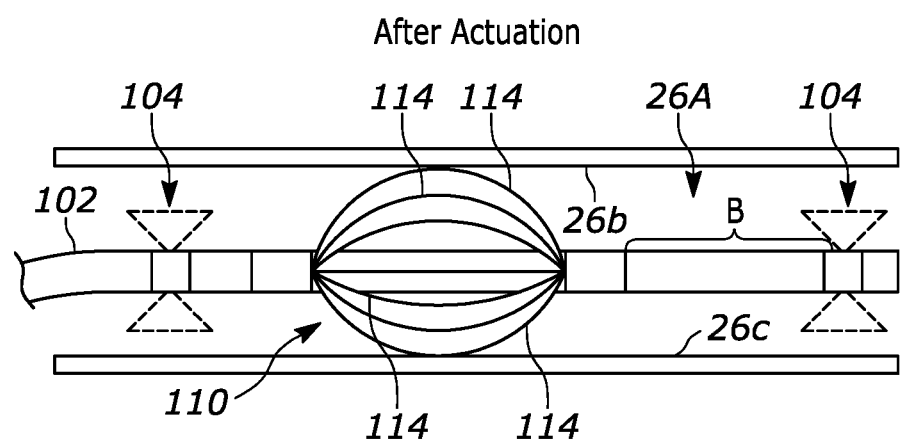
FIG. 3B comprises a schematic view of the tool with tool stabilization mechanism of FIG. 3A after actuation as configured in accordance with various embodiments of these teachings.
Figure 4A:
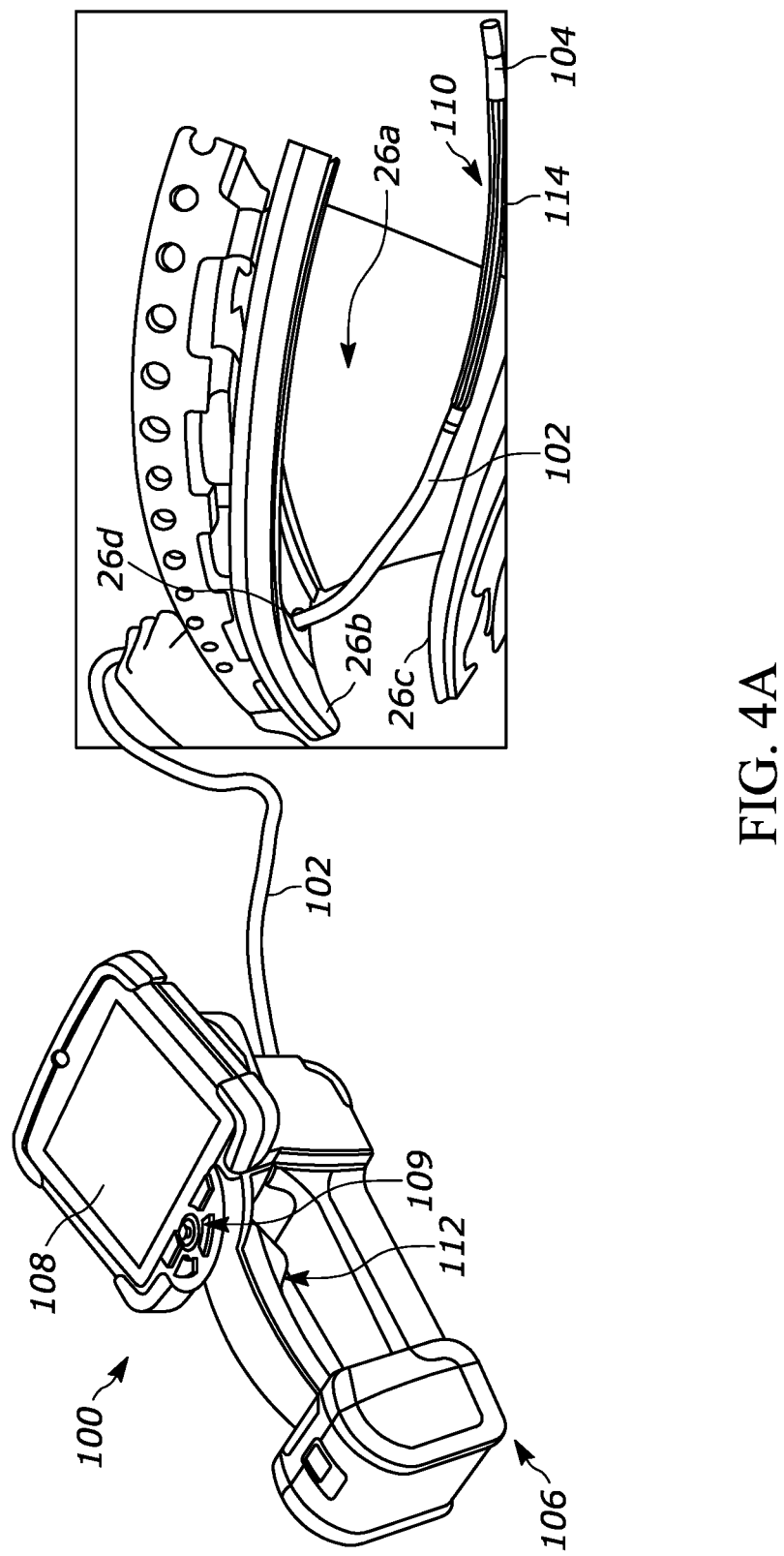
FIG. 4A comprises a schematic view of a tool having a tool stabilization mechanism connected to a borescope and inserted into a combustion chamber of an engine before actuation of the tool stabilization mechanism as configured in accordance with various embodiments of these teachings.
Figure 4B:
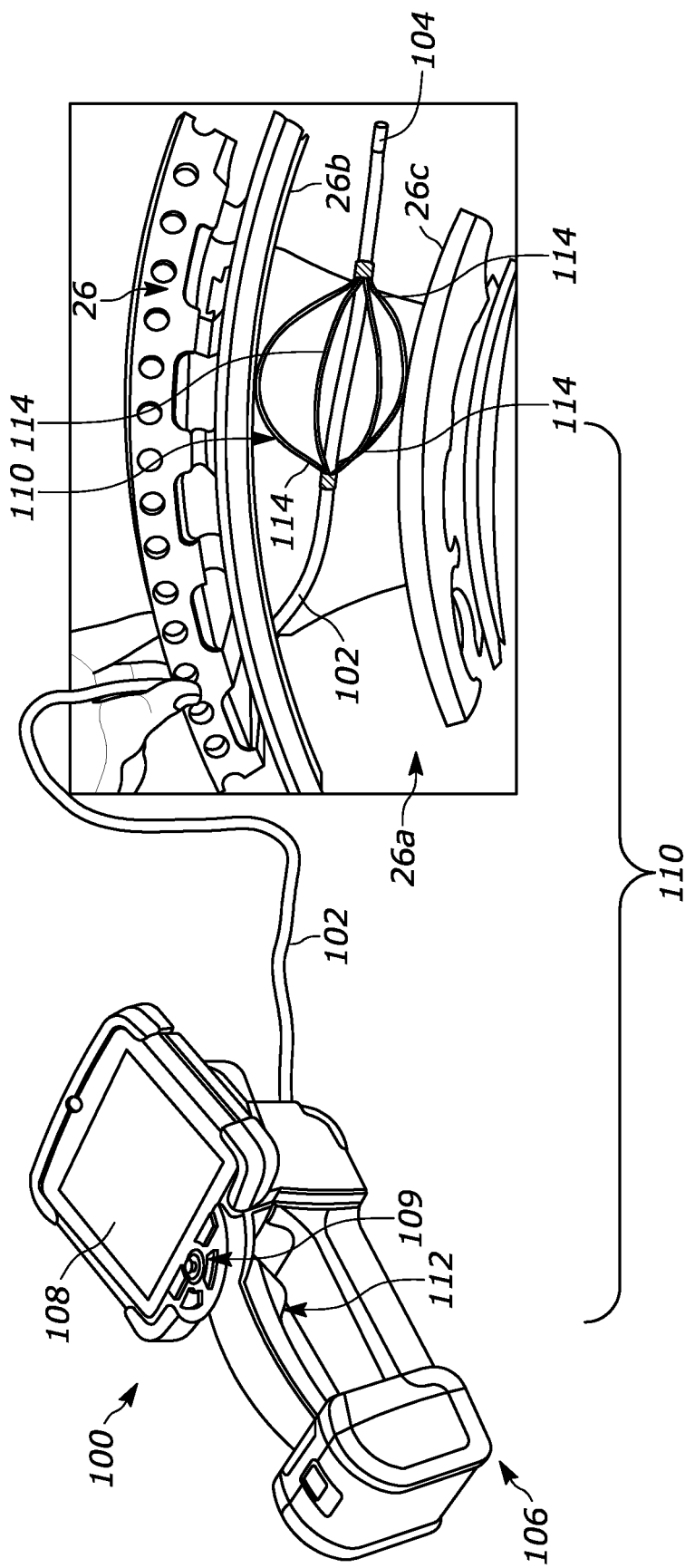
FIG. 4B comprises a schematic view of the tool with tool stabilization mechanism of FIG. 4A after actuation of the tool stabilization mechanism as configured in accordance with various embodiments of these teachings.

As is best illustrated in FIGS. 3A-4B, the borescope probe 102 and camera 104 are fed through the access port 26*d* and into the internal cavity 26*a* of the combustion stage 26. Once inside the cavity 26*a*, the stabilizing device 114 of the tool stabilization mechanism 110 is moved to its deployed position via actuation of an actuator 112. FIGS. 3A and 4A illustrate the stabilizing device 114 of the tool stabilization mechanism 110 in the stored or non-deployed position and FIGS. 3B and 4B illustrate the stabilizing device 114 of the tool stabilization mechanism 110 in the deployed position. In the form shown, actuator 112 is a trigger positioned on handheld unit 106. When the trigger of actuator 112 is pulled, the stabilizing device 114 is moved to its deployed position where it engages with surrounding environment to help stabilize probe 102 and, in particular, the camera 104 so that a stable inspection can be achieved. Conversely, when the trigger of actuator 112 is released, the stabilizing device 114 is moved to its non-deployed position so that the probe 102 and camera 104 can be removed from the cavity of combustion stage 26. In the form shown, the stabilizing device 114 includes a plurality of members that extend radially outward from the probe 102 when in the deployed position to engage surrounding surfaces of cavity 26*a*, such as first cavity wall portion 26*b* and second cavity wall portion 26*c* (which may be opposing wall portions in some instances).

In the form shown, trigger actuator 112 is integrated into the handheld unit 106 and stabilizing device 114 is integrated into probe 102. However, it should be understood that in alternate embodiments the tool stabilization mechanism 110 may alternatively be provided as an accessory that is merely connected to probe 102 such that it could be retrofitted on any conventional borescope. In such an accessory version of the tool stabilization mechanism 110, the stabilizing device 114 could be attached to probe 102 via any fastening means (e.g., clip, clamp, clasp, adhesive, bolt, screw, hook and loop, elastic interference fit etc.) and it may either be configured for permanent attachment or, alternatively, allow for removal of the tool stabilization mechanism 110, if desired.

Regardless of whether the tool stabilization mechanism 110 is integrated into a device or an accessory attachable to same, in a borescope application the stabilizing device 114 would be positioned on probe 102 (preferably proximate the camera 104) and actuator lines would be run along the probe 102 to a position located outside the access port so that the user can actuate the stabilizing device 114 proximate the handheld unit 106. For example, and as will be discussed further below, in some forms, the stabilizing device 114 may be an inflatable bladder and, in such instances, the actuator lines would be tubes capable of carrying whatever substance is being used to inflate the bladder (e.g., air, gas, fluid, etc.). In other forms, the stabilizing device 114 is a plurality of elastic strips that will be moved to a deployed position where the strips protrude out from probe 102 to engage surrounding environment to stabilize the probe 102 and, in particular, camera 104. To accomplish this, the actuator lines running from the stabilizing device 114 may be wires that are used to compress the ends of the strips (e.g., move one end of the strip toward the other) to force the strips to protrude outward from the probe 102 and engage the surrounding environment when the wires are pulled by actuator 112. Thus, the actuator lines would be wires in this instance instead of conduit or tubes. When the actuator 112 is operated, the wires are pulled causing the strips to extend to their deployed position (e.g., a bowed position) and when the actuator is released the wires are released allowing the strips to return to their normally biased non-deployed position (e.g., a flat position). Examples of this movement can be seen when looking at the spacing of the end of stabilization mechanism 110 from camera 104 in FIGS. 3A-B. When the stabilization mechanism 110 is not deployed or is in its retracted state as shown in FIG. 3A, the distance between the stabilization mechanisms 110 and camera 104 is represented by bracket A.

More particularly, the stabilizing device 114 has a first end (e.g., proximal or upstream end) 114*a* and a second end (e.g., distal or downstream end) 114*b* and the second end 114*b* is positioned apart from the nearest proximate camera 104 by a distance represented by bracket A. However, when the stabilization mechanism 110 is deployed or in its protruded state as shown in FIG. 3B, the distance between the stabilizing device 114 of stabilization mechanism 110 and camera 104 grows as represented by bracket B. This is because the protrusions (e.g., arms, strips, wire, etc.) or members of the stabilizing device 114 are extended out further and are no longer adjacent borescope probe 102 (e.g., the second end (or distal or downstream end) 114*b* is a collar that is moved from a normally biased position wherein the members of stabilizing device 114 are adjacent or flush with borescope probe 102 and the second end 114*b* is closer to the nearest proximate camera 104 (as represented in FIG. 3A by bracket A) to a more upstream position closer to the first end (e.g., proximal or upstream end) 114*a*, thereby compressing the members of stabilizing device 114 toward one another and causing them to protrude outward away from borescope probe 102).

In the form shown in FIGS. 3A-3B, the first end 114*a* and second end 114*b* are collars, but only the second end 114*b* is movable with respect to the first end 114*a* and probe 102 and this movement is caused by actuator wires activated by actuator 112 to pull the second end (or collar) 114b closer to first end (or collar) 114a. In other forms the actuator lines running from the stabilizing device 114 may be concentric tubes that are used to compress the ends of the strips like that discussed immediately above (e.g., move one end of the strip toward the other) to force the strips to protrude outward from the probe 102 and engage the surrounding environment when the tubes are displaced by actuator 112. Thus, the actuator lines would be concentric flexible tubes in this instance.

Figure 6:
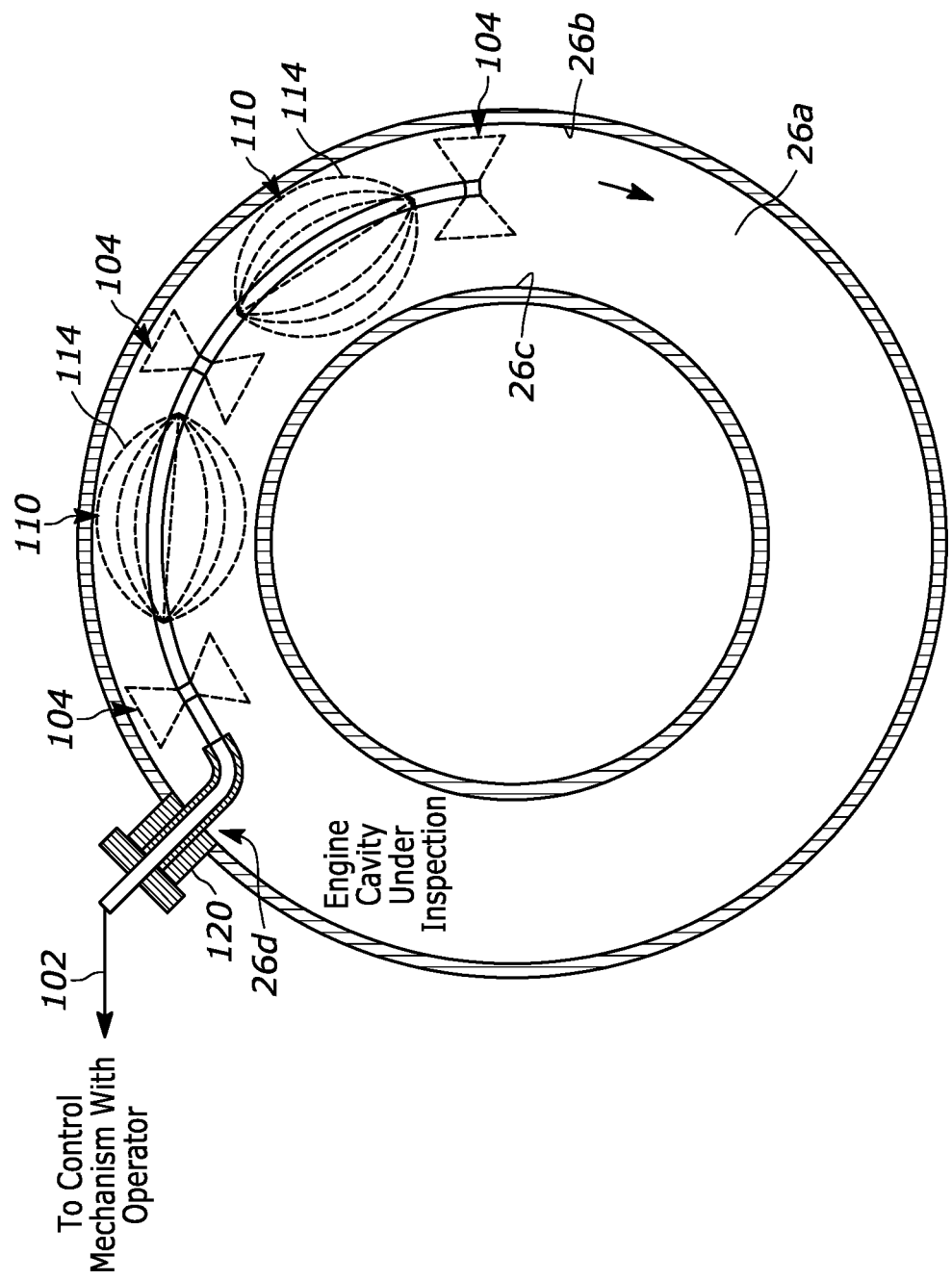
FIG. 6 comprises a schematic view of a tool with a plurality of tool stabilization mechanisms as configured in accordance with various embodiments of these teachings.

As mentioned above, in one form, the stabilizing device 114 may be a bladder that inflates to the deployed position and deflates to the non-deployed position. For example, the bladder may be a single balloon that merely inflates out radially about a circumference of the probe 102 to engage surrounding environment (e.g., inner cavity surfaces) to stabilize the probe 102 and camera 104 contained therein or thereon. An example of such an embodiment is illustrated in FIG. 6 where the stabilizing device 114 is an inflatable bladder (e.g., a balloon) that inflates about the probe 102 to stabilize the probe 102 and/or camera 104. In yet other forms, it may be a plurality of balloons or inflatable members (or inflatable arms) that each stick out from their own location proximate probe 102. This may mean they stick out at different points about the circumference of a section of the probe 102 or it may mean they actually are spaced apart from one another along the longitudinal axis of the probe 102, if desired. The bladder can be filled with any substance to inflate, such as air or other gases, liquid water or other fluids, etc. In one form, the handheld unit 106 may be equipped with a pump that pumps air into the actuator lines to inflate the bladder when the trigger actuator 112 is activated.

Figure 10:
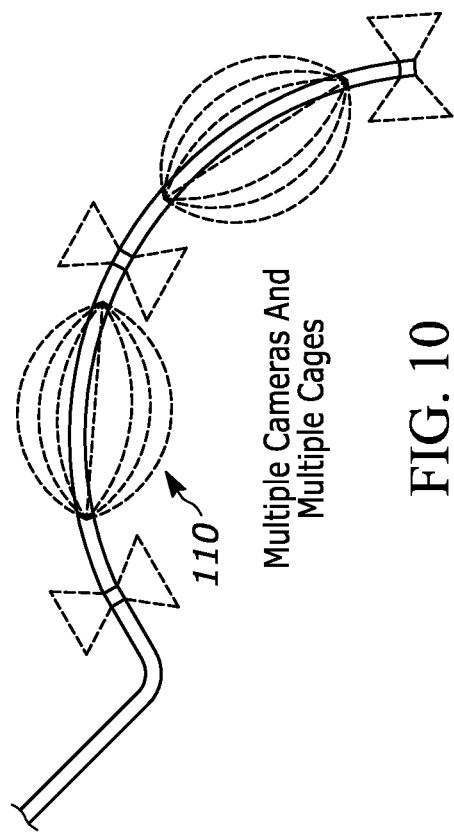
FIG. 10 comprises a schematic view of a tool with a tool stabilization mechanism as configured in accordance with various embodiments of these teachings illustrating a plurality of tool stabilization mechanisms positioned between a plurality of borescope cameras.
Figure 11:
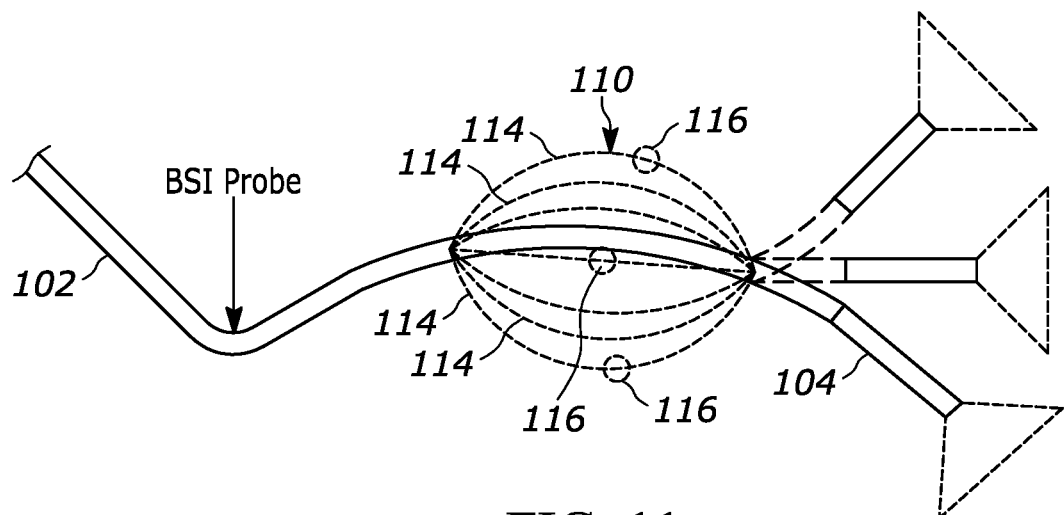
FIG. 11 comprises a schematic view of a tool with a tool stabilization mechanism as configured in accordance with various embodiments of these teachings illustrating the tool stabilization mechanism used in connection with a borescope having an articulating front facing camera (or rotating head camera)
Figure 12:
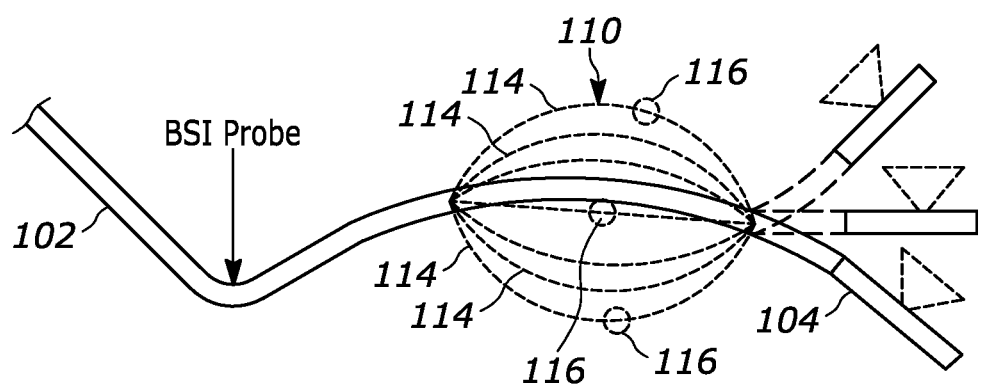
FIG. 12 comprises a schematic view of a tool with a tool stabilization mechanism as configured in accordance with various embodiments of these teachings illustrating the tool stabilization mechanism used in connection with a borescope having an articulating side-facing (or side-mounted) camera (or alternate rotating head camera)

In the embodiment illustrated in FIGS. 3A-3B, a plurality of strips are illustrated as the stabilizing device 114. However, in the embodiment illustrated in FIGS. 4A-B, a plurality of inflatable arms or members are illustrated as the stabilizing device 114. Still further, in the embodiment illustrated in FIG. 6, an inflatable bladder or balloon is illustrated as the stabilizing device 114. The embodiments illustrated in FIGS. 7-12 show the stabilizing device 114 generically as broken lines to make clear it could take any of these forms. In the embodiments of FIGS. 11-12, the stabilizing device 114 may also include one or more roller elements (e.g., wheels, castors, rollers, bearings, etc.) 116 to help assist with moving the stabilizing device 114, probe 102 and camera 104 through the cavity 26a. While the rolling elements 116 are shown as being positioned on only a few of the stabilizing devices 114, it should be understood that they could be on fewer or more as desired. For example, each stabilizing device 114 may include a rolling element 116. In other forms, only one stabilizing device 114 may have such a roller or rolling element 116. Similarly, while only one rolling element 116 is shown on each stabilizing device 114, it should be understood that in alternate forms a plurality of rolling elements 116 may be included on each stabilizing device 114 if desired.

It yet other embodiments, the stabilizing device 114 may include a plurality of flexible members, such as strips of elastic material. In one form, the strips will be connected on one end (e.g., an upstream end when considering the handheld unit 106 to be the furthest part upstream and the distal end of probe 102 to be the furthest downstream end) and preferably to a common sleeve or hub that is fixed in position on the probe 102 (meaning it does not move with respect to the probe). The other end of the strips of stabilizing device 114 will preferably be connected to a common sleeve or hub located further downstream on probe 102 which is not fixed to the probe 102 and may be slid back and forth along probe 102 (e.g., coaxial therewith in a direction parallel to the longitudinal axis of probe 102). Thereby, the downstream hub to which the ends of the strips are connected is movable. In this way, actuator lines, such as wires, may be connected to the movable downstream hub and when actuated by actuator 112 (or other actuator if not integrated into handheld unit 106) the wires will pull the movable hub upstream compressing the ends of the strip toward one another and causing the intermediate portion of the strip (or interstitial portion) to extend out or protrude from the probe 102 as illustrated in FIG. 3B.

In the form shown, the strips of stabilizing device 114 form a frame or cage around the probe 102 and engage surrounding environment (e.g., inner surfaces of the cavity) to stabilize the probe 102 in the cavity of combustion stage 26 and thereby stabilize cameras 104. The actuator lines may be molded into the length of the probe 102 to shield them, or they may be attached externally to the probe 102 via clamps or rings positioned at intervals about the length of the probe 102. In instances where the apparatus/system is provided as an accessory, the latter approach will be used or the user will be instructed to add a sheathing over the probe to protect the wires (either the full length of the probe 102 or at intervals along its length). In some embodiments, the strips or balloons may be configured to deploy radially by a substantially equal amount while in other embodiments the strips or balloons may be configured to deploy by differing amounts to provide advantageous positioning of the borescope in relation to a specific environment and/or in a desired orientation within a particular cavity.

In a preferred form, the strips of elastic material will be made from steel (e.g., spring steel), a superelastic material such as nitinol and/or a plastic. For example, in one form, they will be made of nitinol and will be normally biased in an initial, flat position and forced to bow out or protrude when the strip is moved to the deployed position (e.g., when the movable downstream hub and strip ends connected thereto are moved further upstream toward the other ends of the strips). In the embodiment of FIGS. 3A-3B, the members of the stabilizing device 114 are in the form of flat strips, however, in other forms they may be made more in the shape of round wire. In some forms, the strips may be configured or designed such that they take a predetermined shape, if desired. For example, if it is desired to make the shape of the stabilizing device 114 track the interior shape of the cavity within which the probe 102 and tool stabilization mechanism 110 will be used, then this can easily be done by using preformed strips to extend to the desired shape. Similarly, it can be done with the bladder version of the tool stabilization mechanism 110 as well. While the above-mentioned materials are preferred, it should be understood that the flexible strips may be made of any other material (or combination of materials including, without limitation, any of the above-mentioned materials) that is or are flexible and normally biased in a flat position so that they can maintain the above-described operation.

In alternate forms, the plurality of extendible members may actually be inflatable tubes (like the bladder concept discussed above). The arms could be inflated with fluid, gas or anything that can be temporarily inserted to move the arms to the deployed position and removed to allow them to return to the normally biased non-deployed position. An example of such embodiment is illustrated in FIGS. 4A-4B in which the members of stabilizing device 114 inflate into extending inflated arms or tubes that protrude out from the borescope probe 102 to engage surrounding surfaces of the cavity or space under inspection to help stabilize borescope probe 102 and/or camera 104.

While we have used deployed and non-deployed herein, it should be understood that this action can be described numerous ways (e.g., extended vs. retracted position, protruding vs. non-protruding position, enlarged vs. reduced position, stabilizing vs. non-stabilizing position, etc.). In still further embodiments, the strips may be biased to their deployed shape in their unactuated state, such that actuation results in movement of the strips from the deployed shape to the undeployed shape to aid insertion and removal. In addition, while deployed and non-deployed have been used and are intended to cover the alternate forms mentioned immediately above, it should be understood that deployed may simply mean radial movement of the stabilizing device from a longitudinal axis of the proximate portion of the borescope probe. Further, while a preferred embodiment has the stabilizing device extend out to contact adjacent inner surfaces of the cavity within which the stabilization mechanism 110 is disposed, it should be understood that not all members of the stabilizing device (in instance when there are multiple) need contact adjacent inner surfaces of the cavity.

In the embodiment illustrated in FIGS. 3A-B, it should be appreciated that multiple cameras 104 are illustrated located between the ends of probe 102 (interstitially or intermediate the ends). Conversely, in the embodiment of FIGS. 4A-B, a single camera 104 is shown on the distal end of probe 102. In addition to the above, the cameras 104 illustrated in FIGS. 3A-B are side-viewing cameras with each capable of viewing from opposite sides of probe 102 (thus, acting like four cameras). This configuration allows for multiple sections of the cavity or internal components to be reviewed at the same time which can help expedite the inspection process, however, it is not essential to have multiple cameras as the probe 102 may be easily rotated to obtain a three hundred sixty-degree (360°) view of the cavity. Triangles have been added off the cameras in the drawings to depict the viewing angle of the camera, however, it should be appreciated that these do not represent physical structure as it is desired the entire apparatus and system remain as substantially close to the diameter of the probe 102 as possible with the understanding that the tool stabilization mechanism 110 will add a little to the overall diameter of the probe 102 in the area where it is located. In the embodiment of FIGS. 4A-B, camera 104 is a front facing camera and is illustrated on an articulating probe which can be moved around in various directions in response to movements of joystick 109. It should be understood that in yet other embodiments, a non-articulated probe may be used with a forward-facing camera. Movements of such a camera are not made as easily as they are with an articulated probe, but can still be accomplished by maneuvering the probe outside of the access port (e.g., rotating, spinning, pushing, pulling, etc.) to accomplish same. Thus, there are at least three different types of camera configurations that may be used with the tool stabilization mechanism 110 (e.g., side facing, forward facing, and articulated forward facing which may also be referred to as a rotating head camera). In addition, some cameras may actually take multiple images at a time, (e.g., dual facing cameras taking pictures from opposite sides as discussed above, fisheye cameras, panoramic cameras, etc.).

Figure 5:
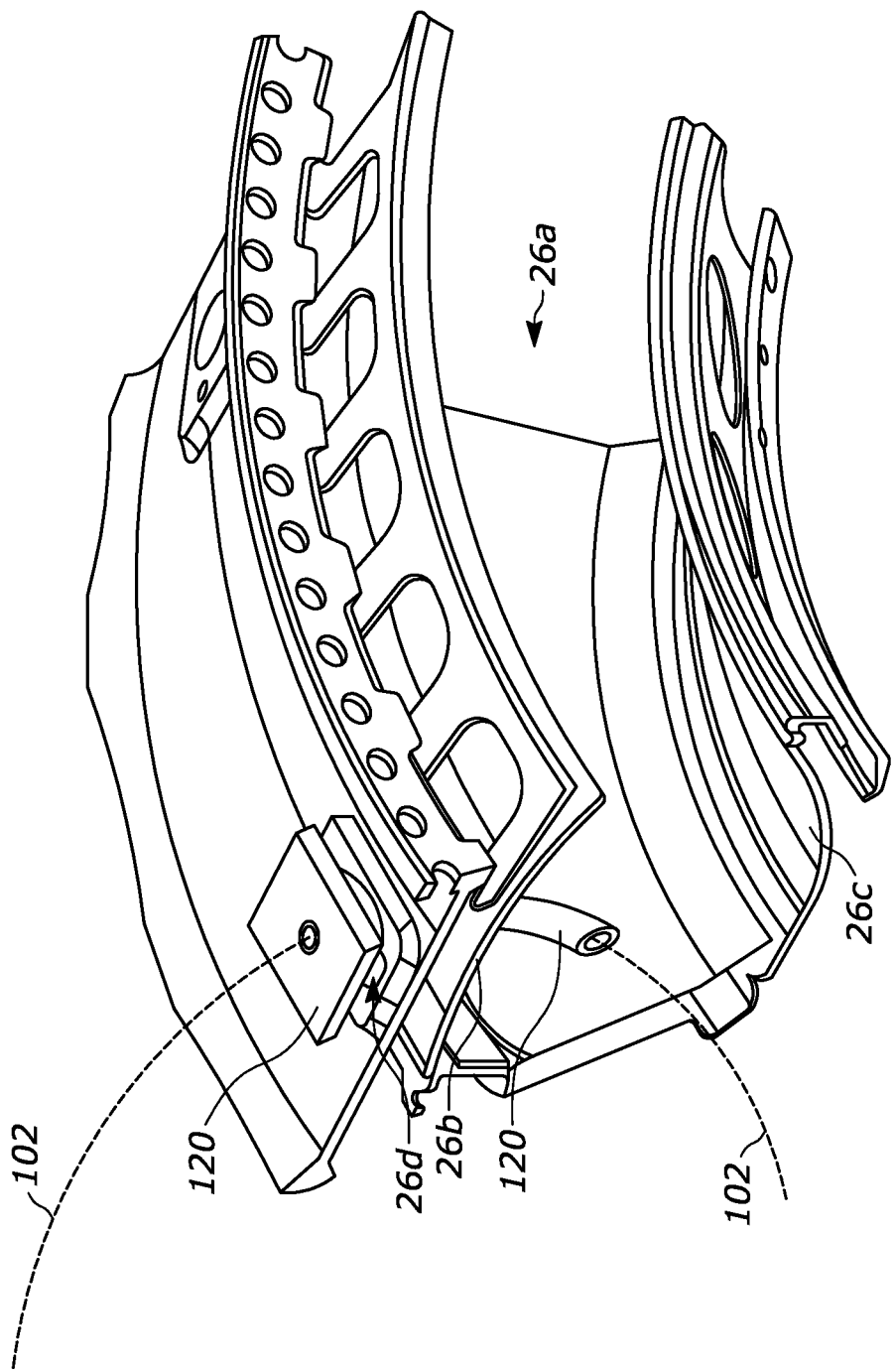
FIG. 5 comprises a schematic view of a gas turbine engine having a guide tube for use with a tool stabilization mechanism as configured in accordance with various embodiments of these teachings.

To assist the user with positioning of the probe 102 and camera 104 (particularly in a non-articulated probe version of same), the apparatus or system may also be provided with a guide tube 120 as illustrated in FIG. 5. In one form, the guide tube 120 is a sleeve or partial sleeve (e.g., open-faced chute) that is positioned within the access port opening 26c and which steers, directs or guides the probe 102 into the desired direction for the particular cavity under inspection. Different guide tubes can be provided for different engines and different engine compartments, or parts being checked. The version illustrated in FIG. 5 is but one version of such a variety of guide tubes and is provided for exemplary purposes only. Further, for convenience, the probe 102 is shown via dashed or hidden line extending into and out of the guide tube 120 disposed in the access port 26c to keep the image clean/less cluttered.

Another difference illustrated in the figures is the positioning of the tool stabilization mechanism 110 with respect to the camera 104 and the probe 102. For example, in the embodiment illustrated in FIGS. 3A-B, a single tool stabilization mechanism 110 is used to position two separate cameras 104. In this embodiment, the tool stabilization mechanism 110 is positioned between the cameras 104 and spaced upstream from the end of the probe 102. Alternatively, in the form illustrated in FIGS. 4A-B, a single tool stabilization mechanism 110 is used with a single camera 104. The tool stabilization mechanism 110 is positioned proximate the camera 104 which is located in the distal end of probe 102.

In yet another form and as illustrated in FIG. 6, two tool stabilization mechanisms 110 are used to properly space and stabilize three cameras 104. Here the probe 102 is fed through a guide tube 120 and uses three cameras separated by the two tool stabilization mechanisms 110 to allow for even more of the cavity of combustion stage 26 to be inspected at the same time. It should be appreciated that this trend of adding cameras and tool stabilization mechanisms 110 could be continued out for as many as a user would desire (which likely will depend on the size of cavity that is to be inspected). While side viewing cameras are illustrated, it should be appreciated that a combination of side viewing cameras and a front-facing camera at the downstream distal end of probe 102 can be used if desired.

Figure 7:
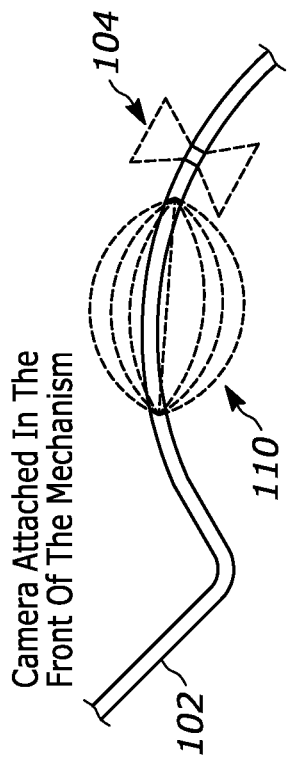
FIG. 7 comprises a schematic view of a tool with a tool stabilization mechanism as configured in accordance with various embodiments of these teachings illustrating the tool stabilization mechanism positioned in front of a borescope camera.
Figure 8:
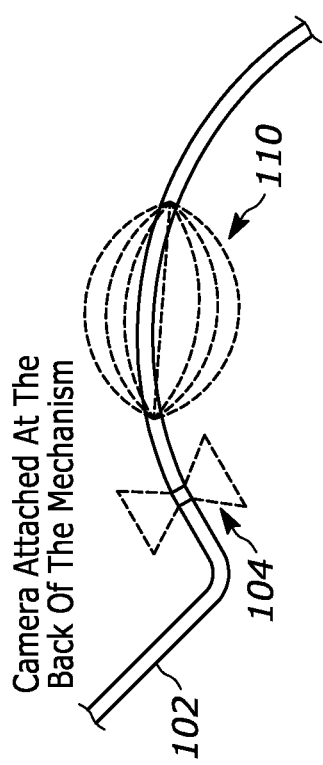
FIG. 8 comprises a schematic view of a tool with a tool stabilization mechanism as configured in accordance with various embodiments of these teachings illustrating the tool stabilization mechanism positioned behind the borescope camera.
Figure 9:
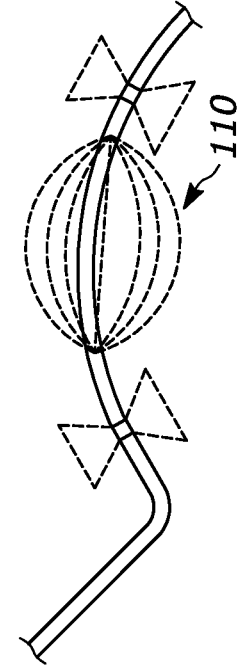
FIG. 9 comprises a schematic view of a tool with a tool stabilization mechanism as configured in accordance with various embodiments of these teachings illustrating the tool stabilization mechanism positioned between a plurality of borescope cameras.

In addition to the number of cameras 104 and tool stabilization mechanisms 110 that can be used, it should also be understood that in alternate embodiments the location of these items with respect to one another may be changed to accommodate and offer different configurations that may be desired. For example, FIG. 7 illustrates an embodiment where the camera 104 is located upstream from and proximate to the tool stabilization mechanism 110. Conversely, in FIG. 8 the camera 104 is located downstream from and proximate to the tool stabilization mechanism 110. In the form illustrated in FIG. 9, two cameras 104 are positioned on opposite sides of and proximate to the tool stabilization mechanism 110. As mentioned above, in alternate forms, multiples of each (cameras 104 and tool stabilization mechanisms 110) may be provided as illustrated in FIG. 10. Also, as mentioned above, the distal end of the probe 102 may be equipped with a camera 104 and that camera may be forward facing and articulable as illustrated in FIG. 11, or it may be side facing and articulable as illustrated in FIG. 12. Again, keep in mind the triangles shown proximate the cameras are simply representative of the viewing angle of the camera and not physical structures. In the embodiments shown in FIGS. 7-12, the members of stabilizing device 114 are illustrated by broken lines, but it should be understood that these may represent any of the forms of stabilizing device discussed herein (e.g., wires, strips, inflatable arms or other inflatable bellows/pillows, etc.).

While not illustrated, in alternate forms, the cameras 104 could be positioned within the bounds of the tool stabilization mechanism 110, however, such a configuration is not as preferred simply because it would necessitate a larger diameter at the point where the camera 104 and tool stabilization mechanism 110 is located when in the non-deployed position (thus making the system need slightly larger diameter openings than if the camera is position outside of the bounds of the tool stabilization mechanism 110). Placing the camera 104 within the bounds of the tool stabilization mechanism 110 would also mean that some of the image captured by the camera 104 would be obstructed by the plurality of flexible members of the tool stabilization mechanism 110 when in the deployed position.

After the inspection, the ports used to access the interior of the engine are closed or sealed back up (e.g., covered, the fuel nozzle put back in if such was removed to gain access to the engine interior, etc.) and the service work logged for this activity. It should be appreciated that with the tool stabilization mechanism described herein, it will be possible to do inspections quicker, covering more structures and surfaces in less time and could eliminate the need to enter the engine from multiple access points (e.g., with a tool stabilization mechanism 110 such as that disclosed, one does not need to worry about deflection or vibration and will be able to pass the probe throughout the entire cavity from a single access point if desired. If that is not desired, certainly the tool stabilization mechanism 110 disclosed herein allows for a much longer distance of travel to be accomplished, so it may at a minimum cut down the inspection to only needing two points of access rather than four. For example, one user may insert a borescope with the tool stabilization mechanism and do half of an engine while another worker does the same for the other half of the engine so that both can be done at the same time (potentially cutting the time by three-fourths (¾) the amount of time it would normally take).

Some advantages of the configurations discussed herein include: allowing for 360° controlled coverage of the cavity under inspection; enables repeatable positioning of camera (without concern of the deflection or vibration problem discussed with the prior art), enables a simple support mechanism with a simple and cost-effective design, and allows for more load to be carried and/or for extended distances to be travelled without concern of cantilevering/ deflection or vibration. This reduces inspection time, gathers faster, consistent and repeatable images, obtains clearer images due to stability, and allows for more controlled movement of the probe 102 and associated camera(s) 104. The fact that more load can be accommodated further opens up the opportunity to utilize different or additional tools beyond the probe with camera alone. Further, if the load is too great, a second tool stabilization mechanism can be added on the opposite side of the load to offer the needed support/stabilization. In addition to the above, the tool stabilization mechanism can further be customized to a desired design so as to fit a particular cavity, accommodate a particular load in the desired way, and/or position the camera in a desired spot or space it a desired distance from surfaces. The predetermined spacing the tool stabilization mechanism offers assurance of or may also allow for use in applications that have more sensitive surfaces and/or equipment to be inspected and/or applications utilizing more sensitive equipment that cannot risk being damaged (e.g., more sensitive cameras, lenses, tools, etc.).

In addition to the above, it should be understood that the tool stabilization mechanisms disclosed herein further allow for additional features and tasks to be accomplished when compared to what has otherwise been possible. For example, the one or more members of stabilizing device 114 of the tool stabilization mechanism 110 may be equipped with additional features to accomplish more with each engine inspection. In one form, they may be equipped with non-marring materials that ensure the camera(s) 104 will be properly spaced from the inner walls or surfaces of the cavity being inspected to prevent damaging same. They may also be equipped with cleaning materials (e.g., cloths, material, detergents, etc.) to help clean the inner cavity while inspecting and/or with lubricants to help lubricate hard-to-reach areas while inspecting. They may alternatively be equipped with means to apply repairs or coatings (e.g. a spray nozzle and supply lines) to help repair or prevent damage to the inner cavity. In yet other forms, they may contain additional structures, such as rolling elements 116 shown in FIGS. 7-10 (e.g., wheels, casters, bearings, rollers, etc.) to help assist the probe 102 from traversing the cavity without issue or with reduced friction. All of the above can help improve efficiency, accuracy and repeatability of inspections (e.g., making it easier to pull the probe through the cavity, making it easier to focus on a particular spot and/or come back and look at that exact spot, etc.).

Figure 13:
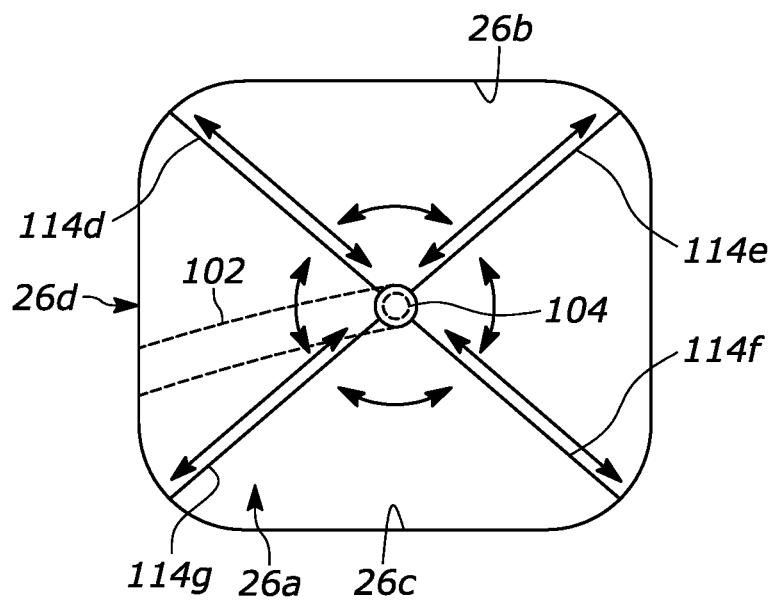
FIG. 13 is a schematic view of a tool within a cavity with a tool stabilization mechanism deployed to position the tool within that cavity as configured in accordance with various embodiments of these teachings.

As mentioned above, the tool stabilization mechanism 110 may be configured generically such that it a universal device for use amongst many different applications (e.g., many different cavities, etc.). Alternatively, it may be designed in more specific manners for specific applications. For example, and as shown in FIG. 13, the stabilizing device 114 may be provided in an application specific configuration with members 114d, 114e, 114f and 114g that are of specific lengths for a given application (e.g., cavity) the stabilizing device 114 will be used in. In this illustration, a borescope end view is illustrated showing the camera 104 at the end of the borescope probe 102 inserted through an access port 26d (e.g., a fuel nozzle) and disposed within a specific cavity 26a for inspection. The members 114d, 114e, 114f and 114g are of select lengths and/or select angles with respect to the probe 102 and/or camera 104 which are specifically designed to fit within cavity 26a in a desired way and, by so doing, to position the camera 104 in a desired way. More particularly, in the form illustrated in FIG. 13, members 114d and 114e are shorter than members 114f and 114g and extend at different angles therefrom such that the members reach out to the corners of cavity 26a to contact opposing surfaces 26b and 26c and position camera 104 in a desired manner for inspection of that particular cavity 26a. This application specific feature (or "tracking") allows the tool to be used in a way where repeatable measurements may be taken more consistently and easily.

Figure 14:
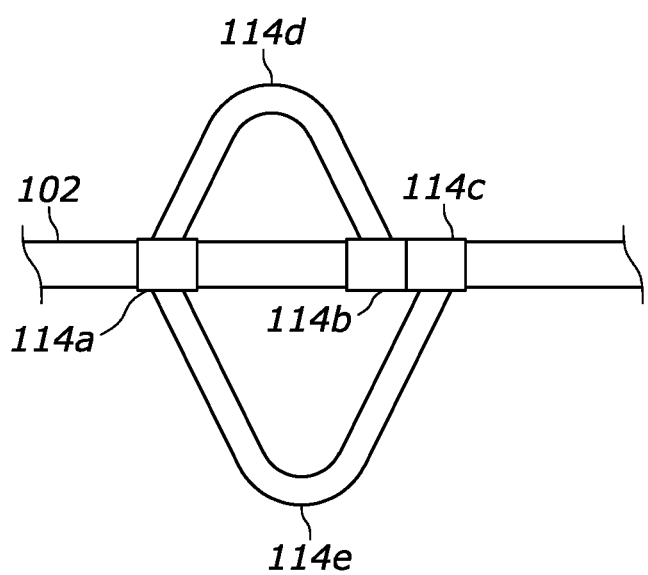
FIG. 14 is a schematic view of a tool with a tool stabilization mechanism as configured in accordance with various embodiments of these teachings.

In other configurations, tool stabilization mechanism 110 may have a stabilizing device 114 with members of differing length (such as members 114d, 114e, 114f and 114g) in order to accommodate a different configuration while still allowing the stabilizing device 114 to move or collapse back into the non-deployed position such that it reduces the overall diameter of the product so that it is easier to insert into and remove from access port opening 26d. For example, in FIG. 14, members 114d and 114e are provided of different lengths and each extend from a common collar or end 114a to their own respective collar or end, such as collar 114b and 114c, respectively. Thus, shorter member 114d extends from the first collar or common collar 114a on one end and terminates in a second collar 114b, while longer member 114e extends from the first collar or common collar 114a and terminates in a third collar 114c. This configuration allows for the two members 114d, 114e to be of different lengths, but still to collapse or close more completely when in the non-deployed position so that the members 114d, 114e may rest generally flush to the probe 102 or substantially parallel to the probe 102 and its longitudinal axis so that the probe 102 is easy to insert and/or remove from any cavity. More particularly, (e.g., the first collar 114a is fixed and the second and third collars, 114b, 114c respectively, are independently moveable with respect to one another and with respect to collar 114a, to allow for different limits of travel so that their respective members 114d, 114e can be fully returned to their normally biased, non-deployed position where they rest proximate the probe 102 (e.g., lay flat against the probe 102) over their entire length or substantially over their length. Since member 114d is shorter, its distal end connected to second collar 114b travels a first length or a first distance from first collar 114a and member 114e (which is longer than member 114d) and its distal end connected to third collar 114c travels a second length or a second distance from first collar 114b which is longer than the first length or first distance traveled by the distal end of member 114d and second collar 114b.

Further aspects of the disclosure are provided by the subject matter of the following clauses:

In some forms, the tool stabilization mechanism includes a stabilizing device connected to a tool and movable between a deployed position and a non-deployed position, and an actuator for actuating the stabilizing device to move between the deployed position and the non-deployed position.

The apparatus/system may be configured where the tool is a borescope probe with camera and the stabilizing device comprises an inflatable bladder or a plurality of extendible members, which move between the non-deployed position and the deployed position wherein the inflatable bladder or extendible members make contact with a surrounding environment within which the tool stabilization mechanism is disposed when in the deployed position to help stabilize the tool.

In some forms, the stabilizing device is the plurality of extendible members which comprise strips of elastic material made from at least one of a steel (e.g., spring steel), a superelastic material (e.g., nitinol), and/or plastic.

The extendible members, in some embodiments, may be made from nitinol and are pre-formed in an application specific configuration to track the shape of a cavity within which the tool stabilization mechanism is at least partially disposed.

In other forms, the extendible member is made of a non-marring substance to protect any surrounding environmental surface that the tool stabilization mechanism comes into contact with during use.

The stabilizing device may alternatively be an inflatable bladder comprising at least one balloon capable of deflating while the stabilizing device is in the non-deployed position and inflating when the stabilizing device is in the deployed position.

In some forms, the at least one balloon comprises a plurality of balloons that inflate into inflated arms extending from the tool to contact the surrounding environment and stabilize the tool.

In yet other forms, the tool may be a borescope probe with a plurality of cameras and the stabilizing device comprises a plurality of stabilizing members each positioned proximate one of the plurality of cameras to help stabilize the cameras when the stabilizing members are in their respective deployed position.

In one embodiment, the tool is a borescope probe with camera and the camera is at least one of a fixed forward-facing camera, a side viewing camera and/or an embedded camera in a distal end of an articulating or flex tip borescope probe.

For some applications, the tool stabilization mechanism is integrated into the borescope probe. In others, it is merely an accessory attachable to any conventional borescope or borescope probe.

In some forms, the stabilizing device (or plurality thereof if applicable) may include at least one rolling element connected to the stabilizing device for assisting with moving the tool within a cavity for inspection purposes thereof.

In one embodiment, the actuator is at least one of a trigger, button, knob, flange or lever for actuating pull-wires to move the camera stabilization mechanism between the deployed position and non-deployed position.

In one form, the probe may include a plurality of cameras and the tool stabilization mechanism includes at least one stabilization device positioned between the plurality of cameras. In another form, the tool stabilization mechanism includes a plurality of stabilization devices each positioned proximate one of the plurality of cameras. For example, once attached to the probe, a system may be provided containing a first camera, a first stabilization device, a second camera, a second stabilization device and a third camera, in that order. In some forms, the third camera may be positioned at a distal end of the probe. In other forms, the system may include a first camera followed by a first stabilization device positioned proximate a distal end of the probe. In yet other forms, the system may include a first stabilization device followed by a camera positioned proximate a distal end of the probe. In still other forms, the system may include a first camera, followed by a first stabilization device and then a second camera, in that order.

As mentioned above, the concepts disclosed herein may be utilized in an accessory attachable to any borescope or they may be integrated into the borescope. In addition to the above embodiments, apparatus and systems, it should be appreciated that various related methods have also been disclosed herein. For example, a method of conducting improved cavity inspections is disclosed including: providing a borescope including a handheld unit having a flexible guide-tube probe with a camera for exploring a cavity, and a tool stabilization mechanism for stabilizing the probe within the cavity to allow for easier inspection of the cavity, the tool stabilization mechanism having an actuator for moving the tool stabilization mechanism between a deployed position for conducting inspections and a non-deployed position for simplifying insertion and/or removal of the borescope probe; inserting the probe into an interior of the cavity to be inspected; deploying the tool stabilization mechanism via the actuator to place the tool stabilization mechanism in the deployed position and stabilize the borescope during inspection of the cavity; and returning the tool stabilization mechanism to the non-deployed position for removal of the borescope from the interior of the cavity.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosure concept.

What is claimed is:

1. A tool stabilization mechanism system comprising:
   a tool stabilization mechanism having a plurality of stabilizing devices connected to a tool and movable each between a deployed position and a non-deployed position, the tool stabilization mechanism being sized and configured to fit into and operate within an engine passage of an aircraft engine; and an actuator for actuating the stabilizing devices to move each device between the deployed position and the non-deployed position;

wherein each stabilizing device includes a plurality of extendable members and each of the extendable members has a first end and a second end with each of the first end and the second end being coupled to the tool and wherein a middle portion is located between the first end and the second end, and when the extendable members are expanded into the deployed position the middle portion of selected ones of the extended members moves outward relative to the tool and supports the system relative to a wall defining the engine passage;

wherein each of the plurality of stabilizing devices includes a proximal end and a distal end, wherein the relative positioning between a first proximal end of a first stabilizing device and a second proximal end of a second and adjacent stabilizing device remains constant during operation.

2. The tool stabilization mechanism system of claim 1 wherein the tool is a borescope probe with a camera.

3. The tool stabilization mechanism system of claim 2 wherein the extendible members comprise strips of elastic material made from at least one of a steel, a superelastic material, and plastic.

4. The tool stabilization mechanism system of claim 2 wherein each of the plurality of stabilizing devices are pre-formed in an application specific configuration to track a shape of a cavity within which each of the stabilizing devices is at least partially disposed.

5. The tool stabilization mechanism system of claim 2 wherein the extendible members are made of a non-marring substance to protect any surrounding environmental surface that the plurality of stabilizing devices come into contact with during use.

6. The tool stabilization mechanism system of claim 1 wherein the tool is a borescope probe with a plurality of cameras and the extendable members are each positioned proximate one of the plurality of cameras to help stabilize the cameras when the plurality of stabilizing devices are in the deployed position.

7. The tool stabilization mechanism system of claim 1 wherein the tool is a borescope probe with camera and the camera is at least one of a fixed forward-facing camera, a side viewing camera and/or an embedded camera in a distal end of an articulating or flex tip borescope probe.

8. The tool stabilization mechanism system of claim 1 wherein the tool stabilization mechanism is integrated into a borescope probe.

9. The tool stabilization mechanism system of claim 1 wherein the tool stabilization mechanism is an accessory that is at least one of attachable to and removable from a borescope probe.

10. The tool stabilization mechanism system of claim 1 further including at least one rolling element connected to each of the plurality of stabilizing devices for assisting with moving the tool within a cavity for inspection purposes thereof.

11. The tool stabilization mechanism system of claim 1 wherein the actuator is at least one of a trigger, button, knob, flange or lever for actuating pull-wires to move each of the plurality of stabilizing devices between the deployed position and non-deployed position.

12. A borescope comprising:
a handheld unit having a flexible guide-tube probe and camera for exploring a cavity; and
a tool stabilization mechanism for stabilizing at least one of the probe and the camera within the cavity to allow for easier inspection of same, the tool stabilization mechanism having a stabilizing device and an actuator for moving the stabilizing device between a deployed position for conducting stabilized inspections and a non-deployed position for simplifying insertion and/or removal of the probe and camera, the tool stabilization mechanism being sized and configured to fit into and operate within an engine passage of an aircraft engine;
wherein the stabilizing device includes a plurality of extendable members and each of the extendable members has a first end and a second end with each of the first end and the second end being coupled to the probe and wherein a middle portion is located between the first end and the second end, and when the extendable members are expanded into the deployed position the middle portion of selected ones of the extended members moves outward relative to the probe and provides support relative to a wall defining the cavity;
wherein the stabilizing device includes a proximal end and a distal end, wherein the relative positioning between a first proximal end of the stabilizing device and a second proximal end of a second and adjacent stabilizing device of the borescope remains constant during operation.

13. The borescope of claim 12 wherein the plurality of extendible members move between the non-deployed position and the deployed position and make contact with a surrounding environment.

14. The borescope of claim 13 wherein the plurality of extendible members comprise strips of elastic material made from at least one of steel, superelastic material, and plastic.

15. The borescope of claim 13 wherein the plurality of extendible members extend into a frame or cage that engages the surrounding environment to stabilize the borescope for easier inspection when the extendible members are in the deployed position.

16. A method of conducting improved cavity inspections comprising:
providing a borescope including a handheld unit having a flexible guide-tube probe with a camera for exploring a cavity, and a tool stabilization mechanism for stabilizing the probe within the cavity to allow for easier inspection of the cavity, the tool stabilization mechanism having a stabilizing device and an actuator for moving the stabilizing device between a deployed position for conducting inspections and a non-deployed position for simplifying insertion and/or removal of the probe, the tool stabilization mechanism being sized and configured to fit into and operate within an engine passage of an aircraft engine;
wherein the stabilizing device includes a plurality of extendable members and each of the extendable members has a first end and a second end with each of the first end and the second end being coupled to the probe and wherein a middle portion is located between the first end and the second end, and when the extendable members are expanded into the deployed position the middle portion of selected ones of the extended members moves outward relative to the probe and provide support relative to a wall of the cavity;
inserting the probe into an interior of the cavity to be inspected;

deploying the stabilizing device via the actuator to place the stabilizing device in the deployed position and stabilize the borescope during inspection of the cavity; and returning the stabilizing device to the non-deployed position for removal of the borescope from the interior of the cavity;

wherein the stabilizing device includes a proximal end and a distal end, wherein the relative positioning between a first proximal end of the stabilizing device and a second proximal end of a second and adjacent stabilizing device of the borescope remains constant during operation.

\* \* \* \* \*